V. J. HULTQUIST.
VEHICLE WHEEL.
APPLICATION FILED NOV. 16, 1911.

1,056,994.

Patented Mar. 25, 1913.

2 SHEETS—SHEET 1.

Witnesses:

Inventor:
Victor J. Hultquist
by C. M. Clarke
his attorney

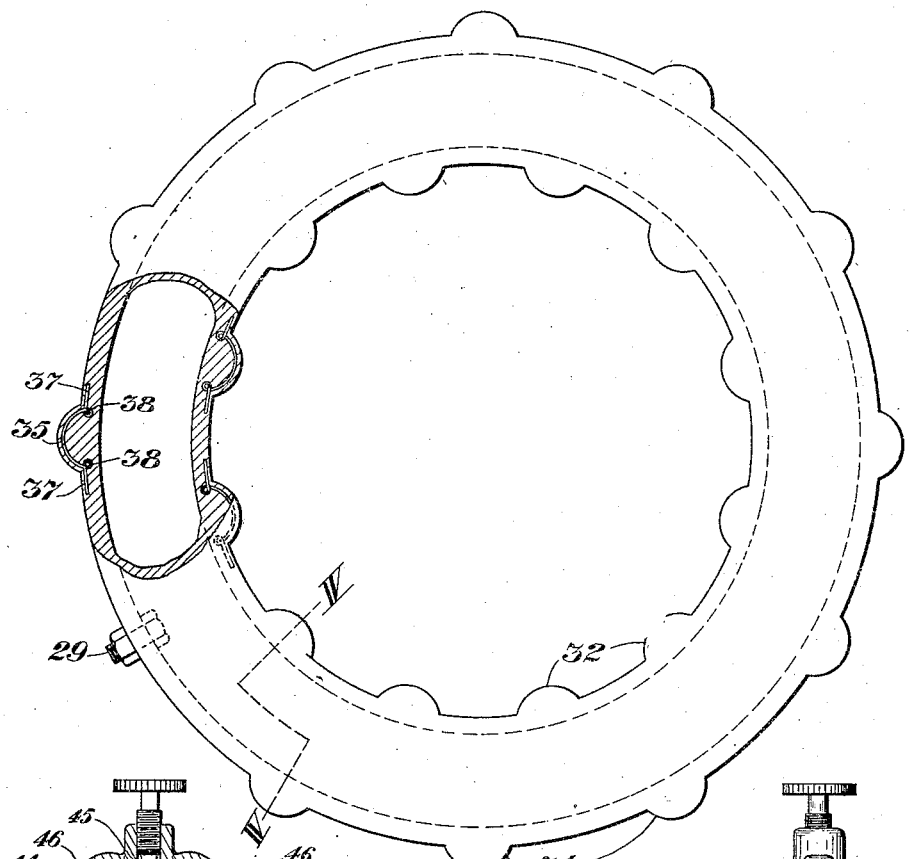
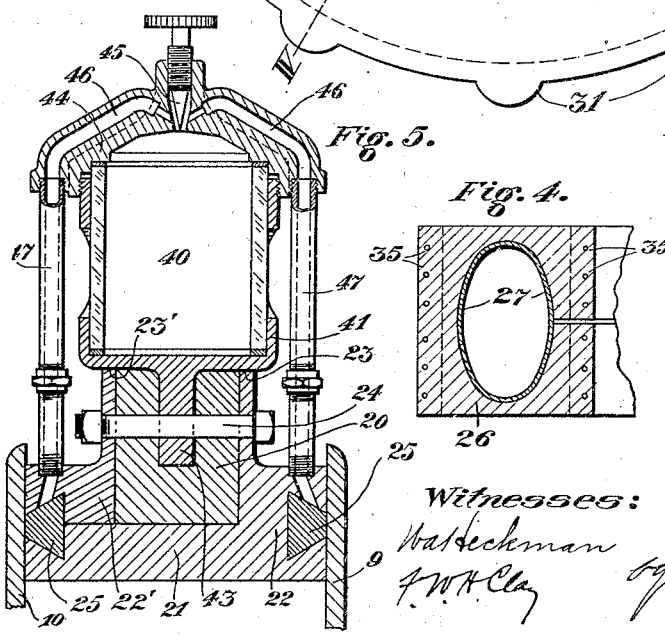
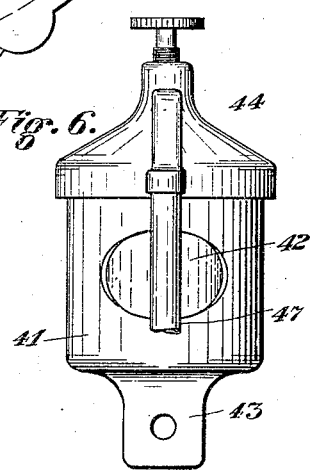

UNITED STATES PATENT OFFICE.

VICTOR J. HULTQUIST, OF BELLEVUE, PENNSYLVANIA.

VEHICLE-WHEEL.

1,056,994.  Specification of Letters Patent.  Patented Mar. 25, 1913.

Application filed November 16, 1911. Serial No. 660,636.

*To all whom it may concern:*

Be it known that I, VICTOR J. HULTQUIST, a citizen of the United States, residing at Bellevue, in the county of Allegheny and State of Pennsylvania, have invented certain new and useful Improvements in Vehicle-Wheels, of which the following is a specification.

My invention consists of an improvement in cushion wheels for automobiles and other vehicles.

It has for its object to provide a strong simple construction employing between the central hub and the outer rim a tire, a compressible elastic intervening annular cushion or cushions. Also means for mounting and supporting the same within the wheel structure in such a manner as to provide for the transmission of the shocks of travel and their diffusion through the entire wheel, facilities for assembling and taking the structure apart, for providing good bearing surfaces, means for temporarily connecting the hub section fixedly with the outer wheel portion, and other features of construction and detail as shall be more fully hereinafter described.

The advantages of a cushion wheel, in addition to the dispensing of the ordinary pneumatic tire, are generally recognized. In my improvement I embody a simple and efficient construction, composed of few parts, comprising a main inner or hub section, an outer tread or wheel section provided with a solid tire, and an intervening annular cushion construction which will effectually absorb the shocks and prevent their transmission by an almost entire absorption thereof. I employ, in combination with the hub section, a cushion supporting member consisting of two outer plates, one of which is provided with an integral annular bearing ring or shelf for the annular cushion, the outer wheel structure being slidably mounted within the outer portion of said plates beyond the supporting bearing for said cushion, means for providing ample lubrication for the working parts, etc.

Figure 1:
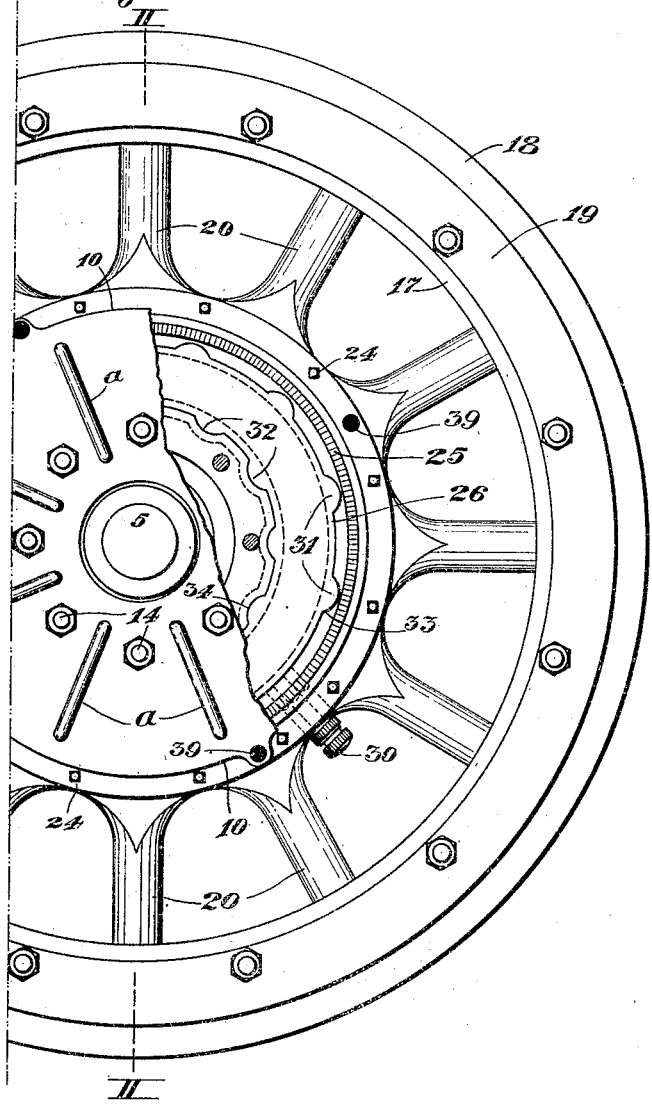
Figure 2:
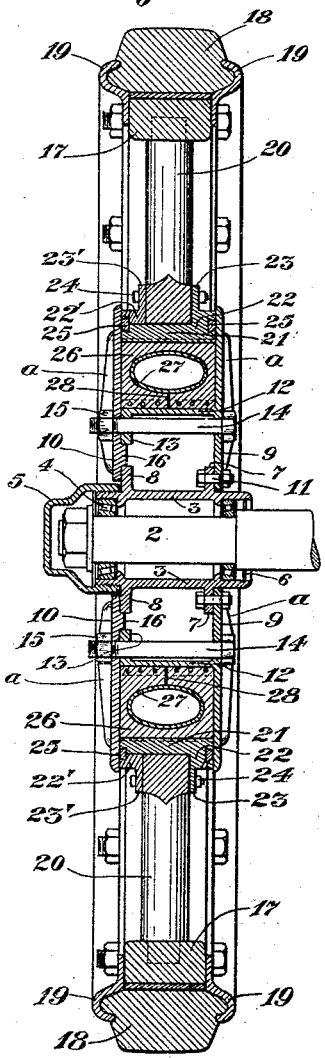

In the drawings illustrating the invention—Figure 1 is a partial face view of the wheel constructed in accordance with my invention, partly broken away. Fig. 2 is a central vertical section thereof on the line II. II. of Fig. 1. Fig. 3 is an enlarged detail view, partly broken away, of one of the annular cushions. Fig. 4 is a cross section therethrough, indicated by the broken line IV. IV. Fig. 5 is an enlarged detail view illustrating a centrifugally operated oil cup and its connection with the lubricating elements. Fig. 6 is a similar view, in elevation, at right angles to Fig. 5.

The wheel structure is mounted on the usual axle terminals 2 and is provided with a central hub section 3, roller or ball bearings 4 of any suitable type being preferably intervened between said parts. A cap 5 is screwed upon the outer portion of the hub and it is provided with an inner lubricant-retaining ring construction 6 of any suitable type, if desired. The hub 3 is provided at each side of its central portion with annular flanges 7, 8, respectively, for providing bearings for the cushion supporting plates. There are two such plates, 9, 10, respectively, of a sufficient radial width to embrace the annular cushion or cushions and to provide ample embracing connections for the inner rim of the main wheel. Each of said plates is preferably provided with radial strengthening ribs a, a. Plate 9 is fixedly connected with the hub flange 7 by a series of securing bolts 11, with their nuts. Said plate is provided at a suitable distance outwardly from the center with an annular integral cushion bearing ring 12 which extends across the entire distance between plates 9 and 10, preferably having an inwardly turned flange 13 at its opposite side. Said flange and end of ring 12 abut against the inner face of ring 10, and the plates and said ring are fixedly connected together by a series of annularly arranged bolts 14. Said bolts are provided with terminal nuts 15, preferably at the side of plate 10, for easy removal. The inner face of plate 10 is provided with an inwardly extending ring 16 providing inner and outer shoulders or annular bearings for flanges 8 and 13 respectively, whereby to positively fix the position of these parts when connected.

The outer main wheel construction consists of the usual annular rim or felly 17 having the tire or tread 18 of hard rubber or other suitable material, secured to the tire in any suitable manner, as by clamps 19. The felly 17 is connected by spokes 20 with the inner annular metal ring 21. Said ring is provided at one side with an integral side portion 22 having a flange 23, and at the opposite side with a similarly shaped removable side portion 22′ having a flange 23′.

The inner widened ends of the spokes are inserted between said side and flange portions, and the parts are securely connected by bolts 24. As thus constructed, and comprised of the two parts, I provide an inner bearing ring for the outer annular face of the cushion structure. Said ring 21 with its sides 22 and 22' extends inwardly beyond the outer peripheral edges of plates 9 and 10 and are embraced thereby and have a sliding engagement therewith. For the purpose of providing lubrication for said parts, I insert at each side of the ring structure and between it and plates 9 and 10 respectively, in dovetail recesses provided for the purpose, annular strips or bands 25, of felt or other suitable material. For the purpose of furnishing lubricant thereto, any suitable oil cup may be employed, as that shown in Figs. 5 and 6 of the drawings, hereinafter described.

Intervening between the integral ring 12 and outer wheel ring 21 is the annular pneumatic cushion 26. This cushion, which is preferably of rubber, is rectangular in cross section, providing inner and outer annular faces for square or transversely flat abutting contact with rings 12 and 21, and flat parallel side faces for abutting contact against the inner faces of plates 9 and 10 respectively. While the cross section of the inner hollow portion of cushion 26 may be of either circular or oval form, I prefer the oval construction, as shown, for the best utilization of the space and the objects desired in practice. Where it is intended that the annular cushion 26 shall be inflated, it is provided with an inner air tube 27, in which case the cushion 26 is divided, as at 28, for insertion and removal of the inner tube. Any suitable connection 26 for application of air pressure may be employed of well-known construction extending outwardly through suitable openings in ring 21, and provided with a terminal cap or closure 30. The annular cushion 26, which is a very important element in the invention, operates not only to absorb the various shocks, but in the case of the rear driving wheels, it acts to transmit the driving torsion from the axle to the outer wheel structure. To insure its successful operation and resistance to the torsional strains arising in use, and for the purpose of transmitting them from the hub portion to the outer wheel portion, the cushion 26 of solid rubber is provided around its outer portion with a series of somewhat closely adjacent projections or ribs 31 and a similar series of ribs or projections 32 around its inner portion. Said ribs are preferably rounded, as shown, and of ample size to give a good holding connection with the inner ring 12 and outer ring 24, each of said rings being provided with corresponding series of sockets or recesses 33, 34, respectively, into which the said ribs project and snugly seat. For the purpose of reinforcing these projecting parts, I embed in the rubber cushion 26 reinforcing wires 35 extending longitudinally around the cushion at such points, curved to the general curvature of the ribs, and extending for a short distance at each side thereof by terminals 37 into the main body section of the cushion. Each curved section 35 is connected with the terminal sections 37, 37, by small loops 38, 38, providing for ample resilience and relative movement of the reinforcing members in action. Said reinforcements are located somewhat closely adjacent along the full length of each rib, as indicated in Fig. 4, and it will be understood that any desired number of them may be used and of the necessary strength. It will also be understood that two or more of the cushioning rings 26 may be inserted side by side by making the hub structure sufficiently wide to receive them, for the purpose of wheels intended for excessive loads, as in the case of trucks, commercial vehicles, etc.

If, at any time, it is desired to fixedly connect the hub section with the outer wheel section, as in the case of a broken or deflated cushion, the plates 9 and 10 may be fixedly connected with the ring structure 21, by bolts inserted through the openings 39 for such purpose. Ordinarily, of course, such bolts are not used and are only inserted in the holes 39 in case of such emergency.

Referring to the lubricating oil cup illustrated in Figs. 5 and 6, it consists of a cup 40, preferably of glass, inclosed within a suitable casing 41 having sight openings 42 and an inner lug 43 adapted to be inserted downwardly in a suitable recess at the inner portion of the spokes 20, between flanges 23 and 23' and held therein by one of the securing bolts 24 extending through an opening in said lug 43, as shown. The outer portion of the oil cup is closed by a cover or cap 44 provided with a controlling needle valve 45 admitting the contained oil to one or more connecting ports 46 in the cup. Each of said ports is connected by a suitable pipe 47 with a port leading into the lubricating strip 25 for supplying oil thereto. In the rotation of the wheel, centrifugal action of the contents of the cup will force the body of contained oil outwardly of the cup and backwardly through pipes 47, maintaining good lubrication in these parts.

The advantages of the invention will be readily appreciated and its construction understood by all those familiar with the use of automobile wheels. It provides ample facility for readily removing or replacing any of the parts; it permits of the wheel being rigidly connected with the hub section in case of any derangement of the cushion member; it avoids the necessity of any supplemental strain-imparting attachments or connections; the construction of the inner cushion provides for all of the necessary resiliency and transmission of the torsional strains; the construction is such as to prevent any undue deterioration or wear of the parts, and as a whole the wheel is symmetrical, strong, simple in construction, not liable to get out of order and capable of long continued use without any attention or repair.

It will be understood that the wheel may be constructed or designed to suit different demands or contingencies of service and for varying loads, and that it may be changed or varied in detail construction by the skilled mechanic, but all such changes are to be considered as within the scope of the following claims.

What I claim is:

1. In a vehicle wheel, the combination of a hub, a circular side plate secured to the hub having an integral annular laterally extending cushion bearing ring, a similar side plate removably secured to the hub and said ring and in shouldered engagement therewith, a wheel having an inner spoke-supporting ring inserted between said plates, and a rectangular annular cushion provided with an inner circular inflatable cavity and laterally extending reinforcing rib projections having metallic reinforcing devices, said cushion having contacting faces in engagement with said side plates, cushion bearing ring and wheel ring respectively, substantially as set forth.

2. In a vehicle wheel, the combination of a hub member, a circular side plate secured thereto having a transverse integral annular cushion bearing ring provided with a terminal flange, a similar companion plate having an inner annular shoulder engaging an annular portion of the hub member and the inner edge of said flange, a series of securing bolts fixedly connecting said plates together, an annular cushion member located between said plates and bearing on said ring, and an outer wheel having an inner ring embraced between said plates and engaging said cushion, substantially as set forth.

3. An annular cushion member for vehicle wheels consisting of a rubber ring, rectangular in cross section and having a circular hollow center and series of alternating inwardly and outwardly projecting radial ridges provided with series of inserted reinforcing elements having oppositely extended embedded terminals, substantially as set forth.

4. An annular cushion member for vehicle wheels consisting of a rubber ring, rectangular in cross section, having series of inwardly and outwardly rounded radially disposed ridges extending transversely across the inner and outer peripheral faces of the ring, and series of similarly shaped reinforcing wires embedded therein having terminals extending in opposite directions into the main body portion of the cushion member, substantially as set forth.

5. An annular cushion member for vehicle wheels consisting of a rubber ring, rectangular in cross section, having series of inwardly and outwardly rounded radially disposed ridges extending transversely across the inner and outer peripheral faces of the ring, and series of similarly shaped reinforcing wires embedded therein having looped terminals extending in opposite directions into the main body portion of the cushion member, substantially as set forth.

In testimony whereof I hereunto affix my signature in the presence of two witnesses.

VICTOR J. HULTQUIST.

Witnesses:
  C. M. CLARKE,
  FREDK. STAUB.